United States Patent Office 3,385,829
Patented May 28, 1968

3,385,829
POLYURETHANE ELASTOMERS
Wolfgang Heydkamp, Erwin Muller, and Cornelius Muhlhausen, Leverkusen, and Heinrich Boden, Opladen, Germany, assignors to Farbenfabriken Bayer Aktiengesellschaft, Leverkusen, Germany, a corporation of Germany
No Drawing. Filed Dec. 7, 1964, Ser. No. 416,584
Claims priority, application Germany, Dec. 5, 1963, F 41,483
4 Claims. (Cl. 260—75)

ABSTRACT OF THE DISCLOSURE

Polyurethane-polyurea elastomers are prepared by reacting a diamine having a molecular weight of from 800 to 3000 and having the formula

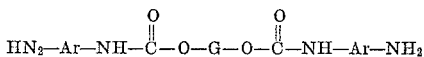

wherein —O—G—O— is a bivalent radical obtained by removing the terminal hydogen atoms from a polymeric diol having a molecular weight of from about 550 to 2750 and Ar is a bivalent arylene radical and from 5 to 40% based on the quantity of the diamine having a molecular weight of from 800 to 3000 of an aromatic diamine having a molecular weight less than about 500 with an excess of an organic diisocyanate. These polyurethane-polyurea elastomers are particularly suitable for spraying onto substrates.

This invention relates to polyurethane plastics, new active hydrogen compounds used in their manufacture, and methods of production. More particularly, it relates to polyurethane plastic formulations useful for spraying nonporous elastomeric coatings.

The production of cross-linked polyurethane elastomers by a spraying process is already known. In this process, high molecular weight linear polyhydroxyl compounds, low molecular weight glycols and diisocyanates are reacted in the presence of accelerators. In the spraying process, it is important to react the said components extremely rapidly with each other. In practice, this is done by mixing the linear high molecular weight polyhydroxyl compounds with the low molecular weight glycols and accelerators and then spraying this mixture together with the diisocyanate, which spraying may be effected by means of nozzles. The presence of the reaction accelerators increases the activity of the individual reaction components to such an extent that the sprayed reaction mixture will already have reacted to such an extent that it will no longer run down vertical walls. Since the reaction velocity of compounds having hydroxyl groups with diisocyanates is not sufficient to meet this requirement, it is necessary to add active accelerators such as tertiary bases or, in particular, organic tin compounds such as tin dibutyl dilaurate or tin octoate. However, these accelerators impair the resistance of the sprayed elastomers to hydrolysis so that it would appear desirable to find systems which satisfy the above requirements without the use of accelerators.

It is therefore an object of this invention to provide improved polyurethane elastomers. It is still another object of this invention to provide formulations for the preparation of polyurethane elastomers particularly useful in spraying applications. It is still another object of this invention to provide a method of preparing active hydrogen compounds containing aromatic amino groups.

The foregoing objects and others which will become apparent from the following description are accomplished in accordance with the invention generally speaking by providing polyaddition products containing aromatic amino groups having a molecular weight of from about 800 to about 3000, preferably from about 1800 to about 2600, and having the formula

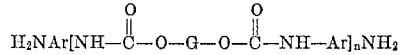

wherein O—G—O is a bivalent radical obtained by removing the terminal hydrogen atoms from a polymeric diol having a molecular weight of at least about 550, n is an integer of at least one to thereby obtain the stated molecular weight and Ar is a bivalent arylene radical which may contain substituents selected from alkyl radicals, alkoxy radicals, aryloxy radicals and halogen radicals and polyurethane elastomers prepared from these polyaddition products by reacting the polyaddition products stated above and aromatic diamines having a molecular weight up to about 500 with an excess of an organic diisocyanate. The formulations set forth are particularly useful in spraying applications where high velocity reactions are desired to prevent running down vertical surfaces.

The reaction velocity between the amino compounds and the diisocyanates is so high that it is unnecessary to add reaction accelerators. Elastomers are thus obtained which differ from the elastomers hitherto produced in spray processes by, among other things, their greater resistance to hydrolysis.

The aromatic amino terminated groups represented above by the general formula can be prepared by reacting a polymeric diol with a nitroaryl isocyanate followed by catalytic reduction of the nitro groups. Any suitable nitroaryl isocyanate can be used such as, for example, o-, m- and p-nitrobenzene isocyanate, 2-nitro-4-isocyanato toluylene, 2-nitro-6-isocyanato toluylene, 2-nitro-6-isocyanato xylylene, 2-nitro-4-isocyanato diphenyl, 2-nitro-2'-isocyanato diphenyl, 4-nitro-4'-isocyanato diphenyl, 2-nitro-4-isocyanato diphenylmethane, 2-nitro-2'-isocyanato diphenylmethane, 4-nitro-4'-isocyanato diphenylmethane, 3-chloro-4-nitro-4'-isocyanato diphenylmethane, 2-nitro-4-isocyanato naphthylene, 2-nitro-5-isocyanato naphthylene, 1-methoxy-2-nitro-4-isocyanato benzene, 1-benzoxy-2-nitro-4-isocyanato benzene, 1-hexoxy-2-nitro-5-isocyanato benzene and the like.

Another method for producing the high molecular weight aromatic amino polyaddition products is to react a polymeric diol with an aromatic diisocyanate. Preferably, the diisocyanate should be used in an amount such that one mol diisocyanate is present per hydroxyl group. The diisocyanate should preferably be one having NCO groups of different reaction velocities so as to avoid unwanted chain-lengthening. Any suitable aromatic diisocyanate may be used such as, for example, 2,4-toluylene diisocyanate,
phenylene diisocyanate,
4,4'-diphenylmethane diisocyanate,
2,5-toluylene diisocyanate,
2,6-toluylene diisocyanate,
4-chloro-1,3-phenylene diisocyanate,
1-methoxy-2,4-phenylene diisocyanate,
1-methyl-3,5-diethyl-2-chlorodiphenyl diisocyanate,
4,4'-diphenyl diisocyanate,
3-methyl-4,4'-diphenylene diisocyanate,
3,3'dimethyl-4,4'-diphenylene diisocyanate,
3-methoxy-4,4'-diphenylene diisocyanate,
3,3'-dimethoxy-4,4'-diphenylene diisocyanate,
3-butoxy-4,4'-diphenylene diisocyanate,
4,4'-diisocyanato-diphenylether,
4,4'-diisocyanato-3-methylphenylmethane,
1,5-naphthylene diisocyanate,
4,4'-diisocyanato-diphenylene dimethylmethane and the like.

As stated above, it is preferred that isocyanates having NCO groups of different reaction rates be used. The most preferred diisocyanate is 2,4-toluylene diisocyanate. The NCO group which terminates the polymer is then converted to an amino group by reaction with formic acid to first form the formyl amide group which is then hydrolyzed with dilute acids or alkali metal hydroxides such as, for example, acetic acid, hydrochloric acid, sulfuric acid, nitric acid and the like and alkali metal hydroxides such as sodium hydroxide, potassium hydroxide, lithium hydroxide and the like under mild conditions to form amino groups.

In the preparation of the aromatic amino terminated polyaddition products having a molecular weight of from about 800 to about 3000 any suitable polymeric diol may be used in the preparation such as, for example, dihydric polyesters, polyalkylene ether glycols, polythioether glycols, dihydric polyacetals and the like.

Any suitable dihydric polyester may be used such as, for example, the reaction product of a dicarboxylic acid and a dihydric alcohol. Any suitable dicarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable dihydric alcohol may be used in the reaction with the dicarboxylic acid to form a polyester such as, for example, ethylene glycol, propylene glycol, butylene glycol, neopentyl glycol, amylene glycol, hexanediol, bis-(hydroxymethyl-cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethyl-amine and the like may be used. Any suitable polyester urethane may be used such as, for example, the reaction of any of the abovementioned polyesters or polyester amides with a deficiency of an organic diisocyanate to produce a compound having terminal hydroxyl groups. Any of the diisocyanates set forth may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane-4,4'-bis-hydroxy ethyl ether and the like.

Any suitable polyhydric polyalkylene ether glycol may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," vol. 7, pp. 257–262, published by Interscience Publishers in 1951 or in U.S. Patent 1,922,459.

Any suitable polythioether glycol may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(β-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should preferably be substantially linear or only slightly branched and have a molecular weight of at least about 550 up to about 2750 and for best results, a molecular weight of from about 1800 to about 2600, a hydroxyl number of from about 43 to about 62 and an acid number less than about 2. Thus, in the formula represented above, any of the polymeric diols set forth will be represented by O—G—O of the formula where the terminal hydrogen atoms have been removed.

In the preparation of urethane elastomers utilizing the aromatic amino terminated compounds, any suitable diisocyanate may be used such as, for example, ethylene diisocyanate, hexamethylene diisocyanate, 2,4-hexahydro toluylene diisocyanate, 2,6-hexahydro toluylene diisocyanate, 1,4-cyclohexylene diisocyanate, p-xylylene diisocyanate, m-xylylene diisocyanate, 4,4'-diisocyanato dicyclohexylmethane and those previously mentioned above in the preparation of the amino terminated compounds and the like.

Any suitable aromatic diamine can be used in the preparation of the polyurethane elastomers in accordance with this invention such as, for example, p-phenylene diamine, m-phenylene diamine, 2,4-diaminotoluylene, 2,5-diaminotoluylene, 3,5-diaminotoluylene, 2,6-diaminotoluylene, 1-methyl-3,5-diethyl-2,6-diaminobenzene, 1-methyl-3,5-diethyl-2,4-diaminobenzene, 1,3,5-triethyl-2,6-diaminobenzene, 3,3'-dimethyl-4,4'-diaminodiphenyl, 3,3'-dimethoxy-4,4'-diaminodiphenyl, 3,3'-diethoxy-4,4'-diaminodiphenyl, 4,4'-diaminodiphenylmethane, 4,4'-diaminodiphenyl dimethylmethane, 1,5-diaminonaphthylene, 3,3'-dichloro-4,4'-diaminodiphenylmethane, 4,4'-diaminodiphenyl-sulfone, 4,4'-methylene-bis(2-chloraniline) and the like. The aromatic amine should be a molecular weight less than 500.

In the present process, the reaction components are used in such proportions that an excess of isocyanate groups is present calculated on the sum of end groups of the mixture of amino compounds. The use of mixtures of compounds containing aromatic amino groups and having a molecular weight of 800 to 3000 and a molecular weight below 500 has two effects. Firstly, with increasing quantities of aromatic diamine of low molecular weight one obtains elastomers with increasing degrees of hardness and at the time improvement of the modulus, and secondly, due to its chemical constitution, the choice of low molecular weight diamine makes it possible to vary the reaction velocity considerably, which is advantageous in providing greater latitude for working up in the spray process. In general, it is possible to use 5 to 40% and preferably 8 to 20% of low molecular weight diamine, calculated on the quantity of high molecular weight diamino compound used. Very reactive systems are obtained, for example, with the use of toluylene diamine, 1,5-naphthylene diamine, benzidene or 4,4'-diaminodiphenylmethane as low molecular diamine, whereas systems with considerably more moderate reactivity are obtained by using, for example, 3,3'-dichloro-4,4'-diaminodiphenylmethane or 4,4'- diaminodiphenylsulphone. One can therefore select one or the other of those systems depending on the apparatus being used. The end reaction of the sprayed product will, of course, be influenced by the choice of components. It will easily be seen that the highly reactive systems will reach their final state more rapidly after spraying than the less reactive systems. Thus, as regards both the material properties of the products and their manufacture, the process provides great possibility of variation.

With regard to the use of apparatus for carrying out the process, the reaction mixture can be sprayed through a nozzle from two vessels, one of which contains the high molecular weight and the low molecular weight diamino compound while the other contains the diisocyanate. The sprayed material becomes solid within a few seconds so that no after-heating is necessary. The elastomer is in practice ready for use in a short time.

The process is suitable both for coating large surfaces and for spraying all sorts of different materials such as leather, metal, paper, wood, solid and porous synthetic resins, rubber and woven fabrics.

The invention is further illustrated but not limited by the following examples in which parts are by weight unless otherwise specified.

Example 1

Preparation of the starting material: About 1960 parts (1.0 mol) polypropylene glycol (OH number 57) are added to about 328.5 parts (2.0 mol) freshly distilled nitrophenyl isocyanate in chlorobenzene and left to react for about 2 hours at about 120 to about 125°. The dinitro compound is catalytically hydrogenated in the presence of Raney nickel and the water produced in the reaction is distilled off with the solvent. The dark brown highly viscous residue can easily be dried at about 80° in a vacuum over several hours. The OH number of the reaction product is about 50.5 to about 51.

Process according to the invention: About 10,000 parts of starting material are intimately stirred with about 2,500 parts of 3,3'-dichloro-4,4'-diaminodiphenylmethane at about 60° C. in the storage vessel of an automatic spray apparatus and the mixture is delivered through a Bosch pump to a mixing nozzle of about 0.5 cc. capacity. The mixture is continuously mixed in the nozzle with 4,400 parts 4,4'-diphenylmethane diisocyanate. Since the delivery rate of the Bosch pump is about 2,000 parts of material per minute, the material remains for only fractions of a second in the mixing head but the sprayed product solidifies in a few seconds. The physical properties directly after spraying (1) and after 8 days storage at about 25° (2) are as shown below:

|  | 1 | 2 |
|---|---|---|
| Tensile strength (kp./cm.²) | 182 | 213 |
| Elongation at break (percent) | 85 | 85 |
| Permanent elongation (percent) | 17 | 16 |
| Tear resistance (kp./cm.) | 104 | 104 |
| Shore hardness A (20°/70°) | 96/96 | 98/97 |
| Shore hardness D (20°/70°) | 65/65 | 67/66 |
| Elasticity (percent) | 37 | 35 |
| DIN abrasion (mm.³) | 95 |  |

Example 2

Preparation of the starting material: About 348.5 parts (2.0 mol) toluylene-2,4-diisocyanate are rapidly added at about 100° to about 1960 parts (1.0 mol) of polypropylene glycol (OH number 57), which has been hydrated for about 1½ hours at about 125°/12 mm. and heating is continued at the same temperature for about 5 hours. The hot, viscous melt is then stirred into about 2,000 parts by volume of about 75° hot concentrated formic acid, heated at about 95° C. for about 30 minutes and the excess acid is distilled off in a water jet vacuum. To split off the formyl end groups, the product is treated for about 5 hours at about 55° C. with a solution of about 140 parts (2.5 mol) potassium hydroxide in about 250 parts by volume water and about 150 parts by volume ethanol, excess bases are neutralized by blowing carbon dioxide through and the mixture of water and alcohol is removed in vacuo. The salt can be separated by taking the product up in methylene chloride and filtration. After distilling off the solvent, a dark brown, highly viscous oil remains behind (OH number 46 to 47). Splitting off the formyl groups may also be carried out using aqueous hydrochloric or sulphuric acid at about 50° C. for about 4½ hours.

Reaction according to the invention: About 250 parts of the starting material are heated for about 30 minutes at about 120°/12 mm. with about 10 parts 3,3'-dichloro-4,4'-diaminodiphenylmethane, cooled to room temperature and mixed in a spraying apparatus with about 28.2 parts hexamethylene diisocyanate and sprayed in a thin layer on a vertical wall. Instead of 10 parts 3,3'-dichloro-4,4'-diaminodiphenylmethane it is possible to employ 4.8 parts of toluylene diamine.

Example 3

About 250 parts of starting material of Example 1 are heated to about 130° C. with about 7.5 parts 1,5-naphthylenediamine and then cooled to about 20° C. This is mixed with about 30.8 parts hexamethylene diisocyanate in a spraying apparatus and sprayed onto a metal plate.

|  | Example 2 | Example 3 |
|---|---|---|
| Tensile strength (kp./cm.²) | 94 | 95 |
| Elongation at break (percent) | 95 | 138 |
| Permanent elongation (percent) | 2 | 3 |
| Ring structure | 20 | 23 |
| Shore hardness A (20°) | 80 | 79 |
| Elasticity | 72 | 67 |

It is of course, to be understood that any aromatic amino compound in accordance with the formula set forth, any organic isocyanates set forth, especially toluylene diisocyanate, or any of the low molecular weight aromatic diamine, especially toluylene diamine, may be used in the examples for the specific compounds used therein and that the examples are for the purpose of illustration and not limitation.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. Polyurethane-polyurea elastomers prepared by reacting (i) a diamine having a molecular weight of from 800 to 3000 and having the formula

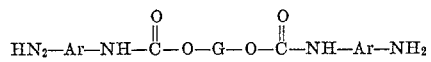

wherein —O—G—O— is a bivalent radical obtained by removing the terminal hydrogen atoms from a polymeric diol having a molecular weight of from about 550 to 2750 and Ar is a bivalent arylene radical and (ii) from 5 to 40% based on the quantity of (i) of an aromatic diamine having a molecular weight less than about 500 with (iii) an excess of an organic diisocyanate.

2. A substrate having sprayed thereon the polyurethane-polyurea elastomer of claim 1.

3. The polyurethane-polyurea elastomers of claim 1 wherein the organic diisocyanate is toluylene diisocyanate.

4. The polyurethane-polyurea elastomers of claim 1 wherein the aromatic diamine having a molecular weight less than about 500 is toluylene diamine or 3,3'-dichloro-4,4'-diaminodiphenylmethane.

References Cited

UNITED STATES PATENTS

| 2,292,443 | 8/1942 | Hanford | 260—77.5 |
| 3,254,056 | 5/1966 | Lovell | 260—77.5 |
| 3,194,793 | 7/1965 | Kogon | 260—77.5 |

(Other references on following page)

FOREIGN PATENTS 606,996 10/1960 Canada.
816,653 7/1959 Great Britain
796,042 6/1958 Great Britain.

OTHER REFERENCES

Wells et al., "Official Digest," "The Properties and Application of Urethane Coatings," September 1959, pp. 1193–1195 relied upon, Copy available in Group 140, Class 260, Subclass 77.5 (Lit).

Alien Property Custodian, Ser. No. 348,683, April 20, 1943, Copy available in Group 140, Class 260, Subclass 77.5.

DONALD E. CZAJA, *Primary Examiner.*

LEON J. BERCOVITZ, *Examiner.*

M. C. JACOBS, F. McKELVEY, *Assistant Examiners.*